Oct. 12, 1943.　　　　P. JUCHTER　　　　2,331,697
CONTROL SYSTEM
Filed Jan. 31, 1941
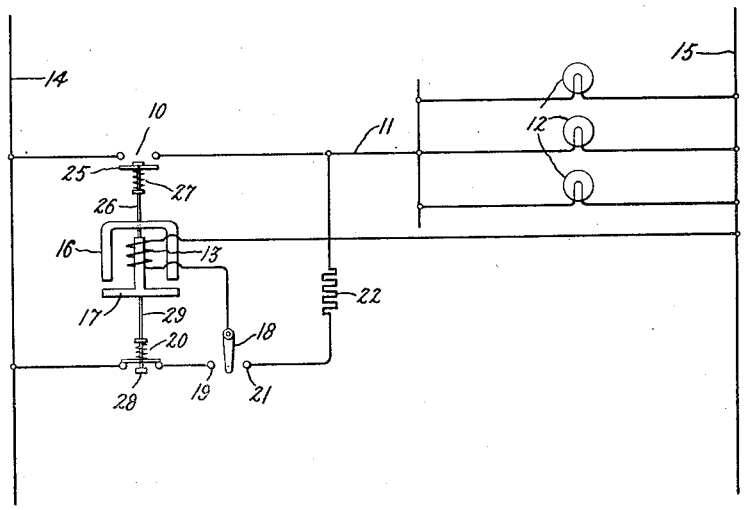
Inventor:
Pieter Juchter,
by Harry E. Dunham
His Attorney.

Patented Oct. 12, 1943

2,331,697

UNITED STATES PATENT OFFICE 2,331,697

CONTROL SYSTEM

Pieter Juchter, Scotia, N. Y., assignor to General Electric Company, a corporation of New York Application January 31, 1941, Serial No. 376,810

2 Claims. (Cl. 175—375)

My invention relates to control systems, more particularly to systems for operating electromagnetic switches of the type held in a predetermined position by residual magnetism, and has for its object a simple and reliable system for operating an alternating current electromagnetic switch of this type.

In carrying out my invention in one form, I provide a two-way single-pole control switch for the energizing winding of the electromagnet. This switch may be operated manually or by a variable control quantity. When thrown in one direction, it connects the coil of the electromagnet across the load circuit in series with a normally closed auxiliary interlock switch operated by the electromagnet. When the main or load switch is closed by the electromagnet, the auxiliary switch is opened to deenergize the coil. To open the load switch, the control switch is thrown to its other position whereby the coil is connected across the load circuit through the load switch, which is now closed, and a resistance for decreasing the alternating current to a value which will deenergize the magnet and cause the load switch to open.

One advantage of my invention is that the control switch is not called upon to open a circuit carrying current. Its circuit is opened very quickly after the control switch is closed by the auxiliary interlock switch or the load switch as the case may be. This is an advantage in the low cost construction of the control switch and also makes possible the operation of the control switch with a slow movement. Another advantage is that the winding of the electromagnet is always energized independently of the load. The load circuit itself may in fact be open, i. e., no lamps or other load may actually be connected in the load circuit at the time that the electromagnetically operated switch in the load circuit is closed.

For a more complete understanding of my invention, reference should be had to the accompanying drawing, the single figure of which is a diagrammatic representation of a control system embodying my invention.

I have shown my invention in one form as applied to the opening and closing of a main or load switch 10 connected in a load circuit 11 containing energy translating devices, such as electric lamps 12 as shown. The switch 10 is normally biased to its open position, as shown, by gravity or it may be biased to its open position by a suitable spring. It is moved to its closed circuit position by means of a magnet coil 13. When closed the switch 10 connects the lamps 12 across supply mains 14 and 15 which are energized with a suitable alternating current.

The coil 13 is provided with a magnet iron core 16 having sufficient magnetic retentivity to hold its armature 17 in its attracted position after the coil 13 is deenergized and thereby hold the switch 10 in its closed position. The core 16 and its armature 17 may be made, for example, of a material containing 3 per cent or more of chromium by weight, the remainder being substantially of iron.

For the control of the coil 13, a single-pole double-throw switch 18 is provided having a stationary switch member electrically connected to the movable contact arm, and also electrically connected to the lower end of the coil 13. When this switch is thrown to its left hand position, as seen in the drawing, into engagement with the stationary switch member or contact 19, the coil 13 is connected across the supply mains 14 and 15 in circuit with the switch 18 and a normally closed interlock switch 20 connected to the armature 17. It will be noted that the upper end of the coil 13 is permanently connected to the supply main 15. The coil 13, upon being energized, picks up the armature 17 which during its movement first opens the interlock switch 20 to deenergize the coil 13 and then closes the main switch 10. The armature 17 is held in its picked-up position by the residual magnetism in it and its core 16.

In order to open the main switch 10, the switch arm 18 is thrown to its right hand position into engagement with the stationary switch member or contact 21. This connects the coil 13 across the supply mains 14 and 15 in circuit with the main switch 10, which is closed, a suitable impedance 22 shown as a resistance, and the switch 18. The resistance 22 reduces the current in the coil 13 to a suitable low value which demagnetizes the core 16 and the armature 17 to such an extent that the armature can not be held by the magnetism available in its attracted position against its bias to its unattracted position. The armature then drops to its unattracted position as shown in the drawing, thus opening the main switch 10 and reclosing the interlock switch 20. The opening of the main switch 10 deenergizes the coil 13.

It will be understood that the demagnetizing current, which is alternating, must be smaller than the current required to move the armature to its attracted position and also smaller than a current which would hold the armature in its attracted position. I have found that a relatively low voltage across the coil 13 for demagnetization causes the armature to drop out very quickly, for example, a voltage of about 2 per cent of the voltage across the supply mains 14 and 15. This low voltage during demagnetization is obtained by selecting a resistance 22 having a suitable high value. One half of each current wave of the demagnetizing current produces a magnetic flux in the core in opposition to the residual magnetism in the core while the other half of the current wave tends to remagnetize the core. However, the residual magnetism is reduced each cycle more than it is again built up because of the fact that more energy is required to magnetize a core than to demagnetize it. As a result, the core is demagnetized quickly to such a degree that it can no longer hold the armature in its attracted position.

Preferably, no air gap is provided between the armature and the core in order that the residual magnetism may be most effective in holding the armature in its attracted position.

For the purpose of providing for wear of the engaging contact surfaces of the switch 10, the movable contact 25 is resiliently secured to the armature 17 so that the switch 10 is closed before the armature has reached its final sealed in or attracted position. The interlock switch 20, however, is arranged to be opened by a very small final closing movement of the armature so that the armature is very nearly in its final attracted position before the switch 20 is opened and the coil 13 thereby deenergized. For example, the main switch contact 25, shown as a bridging contact, is slidably mounted on the rod 26 connected to the armature 17 and resiliently pressed against a stop on the end of the rod by means of a helical spring 27. Thus after the contact 25 engages the stationary contacts, the spring 27 is compressed by continued movement of the armature to its attracted position. A similar arrangement is provided for the bridging contact of the auxiliary switch 20 whereby this contact is resiliently held in its closed position until finally engaged and opened by a stop 28 on the end of the rod 29 connected with the armature.

It will be understood that the control switch 18 may be operated in any suitable manner. For example, it may be operated as a limit switch or it may be operated in response to variable quantities such as light, temperature, pressure or liquid level, etc. Also, the load 12, indicated as electric lamps, may be any suitable load such as an electric motor.

It will be observed that when the control switch 18 is closed either to close or open the main switch 10, the circuit of the coil 13 and the switch 18 is immediately thereafter opened and current flow interrupted therein by either the auxiliary switch 20 or the main switch 10. Thus, the switch 18 is not called upon to open a circuit. Therefore the switch 18 may be operated with a slow movement and designed for low cost of manufacture.

In view of the fact that the coil 13 is energized momentarily only, it can be of inexpensive construction and be wound with a relatively small copper conductor which would be overheated if continuously energized from the supply circuit.

It will be understood that if the armature should not be retained in its attracted position, for example, if it should reach its attracted position at about the zero point on the alternating current wave, the coil 13 is again energized by the reclosing of the interlock switch 20 and the armature is again picked up.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. In combination, a load switch biased to its open circuit position, a pair of electric power supply connections, electric connections for connecting a first of said supply connections to one side of said load switch, the other side of said load switch to one side of the load, and the other side of the load to the second of said supply connections, a coil provided with an armature for operating said load switch to its closed circuit position, a magnet iron core structure for said coil having sufficient residual magnetism after said coil is deenergized to hold said load switch closed, a normally closed interlock switch operated to its open position by energization of said coil, a movable control switch having at least three contact members, electric connections connecting a first of said contact members permanently to one terminal of said coil, electric connections connecting permanently the other terminal of said coil to the second one of said power supply connections, an impedance, electric connections whereby movement of said control switch to connect together said first contact member and a second of said other contact members connects said coil across said supply connections in series with said interlock switch whereby said coil is energized to close said load switch and said interlock switch is opened to deenergize said coil, and electric connections whereby movement of said control switch to connect together said first contact member and a third of said contact members connects said coil across said supply connections in series with said impedance and said load switch for demagnetization of said core and opening of said load switch.

2. In combination, a load switch biased to its open position, first power supply connections connected to one terminal of said load switch, second power supply connections, load connections for connecting said second power supply connections through a load to another terminal of said supply switch, a magnet core, a movable armature for said core connected to close said load switch when moved to an attracted position, a coil for said core for moving when energized said armature to its attracted position, said core being made of a material having sufficient residual magnetism after said coil is deenergized to hold said armature in its attracted position, a permanent connection between one terminal of said coil and the second of said power supply connections, a normally closed interlock switch operated by said armature to its open position when said coil is energized, an impedance electromagnetically separate from said magnet core, a movable control switch having at least three contact members, electric connections between a first of said contact members and the other terminal of said coil, electric connections between said second and third contact members, respectively, and one terminal of said interlock switch and one end of said impedance, electrical connections between the other end of said impedance and a point on said load connections between said power switch and said load, and permanent electrical connections between a second terminal of said interlock switch and said first supply connections whereby said control switch is movable to connect together said first and second contact members to connect said coil to said power connections in series with said interlock switch for energization of said coil to close said load switch, said coil being deenergized by the opening of said interlock switch, and said control switch being movable to connect together said first and third contact members to connect said coil to said first power connections in series with said impedance and said load switch for demagnetization of said core and opening of said load switch.

PIETER JUCHTER.